Oct. 28, 1952  M. V. GROVES  2,615,304
HYDRAULIC MASTER BRAKE CYLINDER HAVING BLEEDING MEANS
Filed Nov. 29, 1949  2 SHEETS—SHEET 1
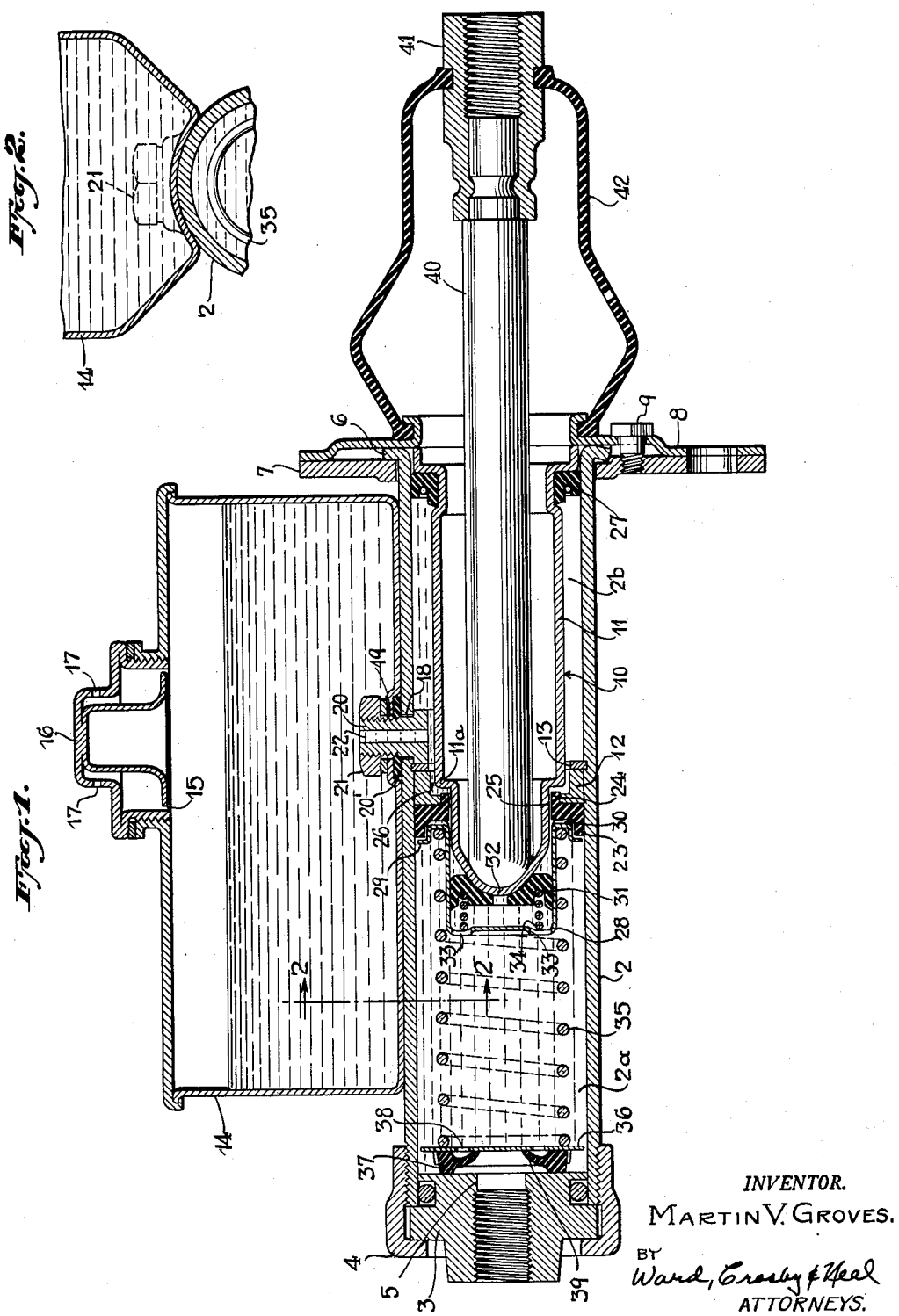
INVENTOR.
MARTIN V. GROVES.
BY Ward, Crosby & Neal
ATTORNEYS.

Oct. 28, 1952  M. V. GROVES  2,615,304
HYDRAULIC MASTER BRAKE CYLINDER HAVING BLEEDING MEANS
Filed Nov. 29, 1949  2 SHEETS—SHEET 2
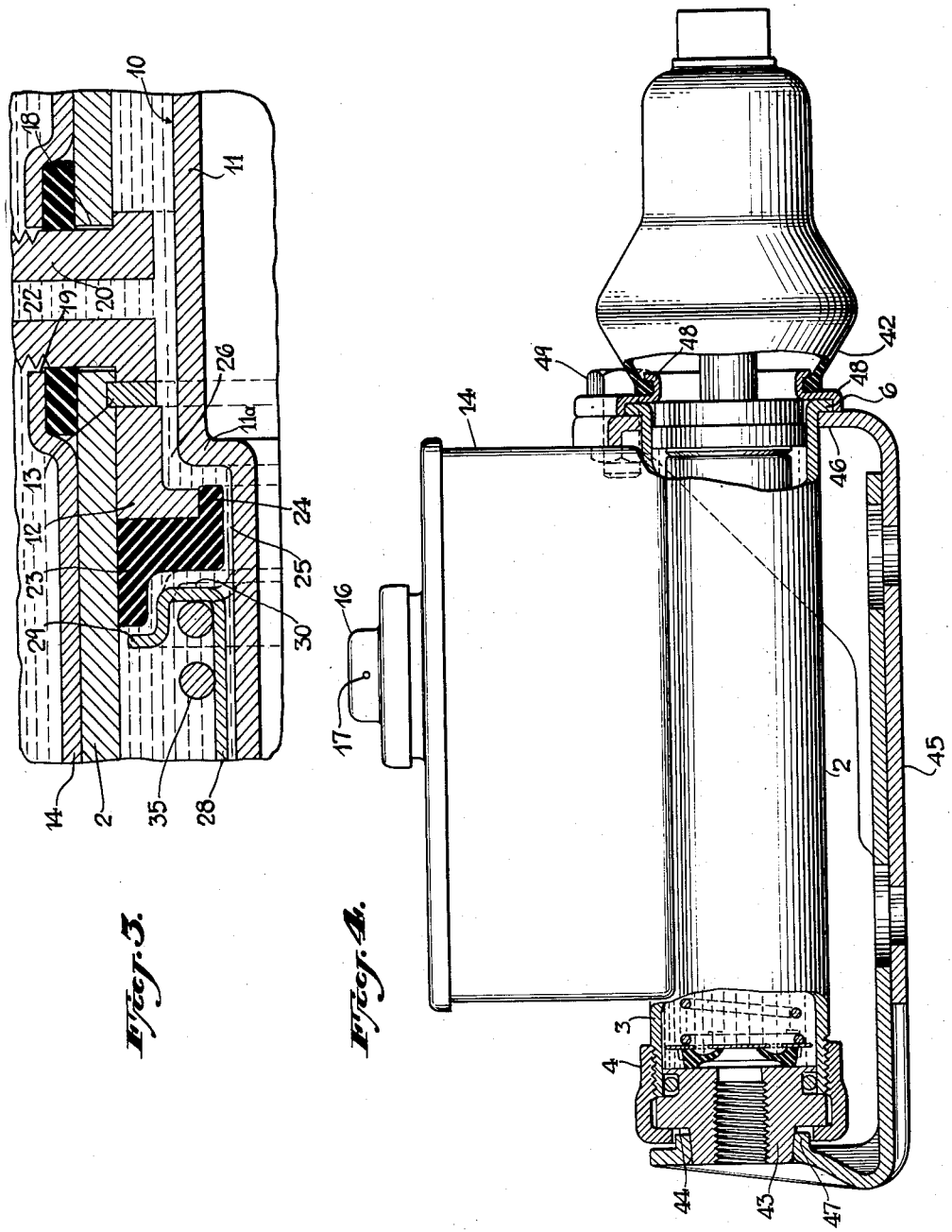
INVENTOR.
MARTIN V. GROVES.
BY
Ward, Crosby & Neal
ATTORNEYS.

Patented Oct. 28, 1952

2,615,304

UNITED STATES PATENT OFFICE 2,615,304

HYDRAULIC MASTER BRAKE CYLINDER HAVING BLEEDING MEANS

Martin V. Groves, Brooklyn, N. Y.

Application November 29, 1949, Serial No. 130,005

10 Claims. (Cl. 60—54.6)

This invention relates to fluid pressure braking systems and, more particularly, to hydraulic brake master cylinders of the horizontal type for use in such systems.

In hydraulic brake systems hitherto known or used, it has been the general practice, where a horizontal type master cylinder is employed, to place the cylinder in communication with a liquid reservoir through both a supply port and a compensating port for removing air trapped in the cylinder. The compensating port is so positioned that with the piston in its fully retracted position, the port is disposed slightly ahead of the sealing cup carried on the piston head. As the piston moves through its protractile stroke to compress the fluid within the cylinder, the resultant pressure generated at the piston head expands the sealing cup such that it tends to enter the compensating port as it moves thereacross with the result that it becomes worn and, in some instances, is torn and its sealing effect is greatly diminished. The present invention aims to overcome this disadvantage by eliminating the compensating port from the master cylinder structure.

Another object of the invention is the provision of a new and improved master cylinder in which gases, usually air, trapped within the cylinder, are syphoned off into the fluid reservoir during the movement of the piston.

A further object is to provide a new and improved master cylinder which is simple in construction, readily fabricated and assembled, and economical to manufacture.

The invention will now be described in detail by reference to the accompanying drawings in which:

Fig. 1 is a sectional view, taken on a vertical plane passing through the axis of the cylinder, of an hydraulic brake master cylinder incorporating the features of the invention and in which the various parts are shown in their normal, unoperated positions;

Fig. 2 is a view in section taken along the line 2—2 of Fig. 1;

Fig. 3 is an enlarged fragmentary view of a part of the cylinder of Fig. 1 showing clearly the path over which the brake fluid may flow during the operation of the cylinder; and Fig. 4 is a fragmentary horizontal sectional view showing alternative mounting means for the cylinder.

In the form shown in Fig. 1 of the drawings, the invention comprises a cylinder barrel 2 composed of steel tubing, the forward end of which receives an end cap 3 held in place by means of an end cap nut 4, the end cap being provided with a central opening 5 therethrough, which serves as a fluid pressure delivery port for conducting fluid under pressure to the respective wheel brake cylinders, in a manner well known in the art. The rear end of the cylinder barrel 2 is provided with an annular flange 6 which overlies a mounting plate 7 disposed about the cylinder barrel. A clamping plate 8 is placed in face-to-face engagement with the annular flange 6 of the cylinder barrel 2 and the mounting plate 7, and is secured to the mounting plate as by the screw 9. The mounting and clamping plates are composed of stamped sheet metal and jointly serve as a detachable bracket assembly by means of which the cylinder may be mounted or supported in an automobile, for example.

A piston generally indicated at 10 is reciprocable within the cylinder 2 and includes a main body portion 11 composed of stamped sheet metal and an annular detached head 12 spaced apart from the main body portion whereby the main body portion of the piston during the initial portion of its protractile movement may move with respect to the detached head. In the unoperated position shown in the drawings, the detached piston head 12 rests against a stop ring 13, fixed against axial displacement, as by being seated in a recess in the cylinder barrel 2, while the rear end of the main body portion 11 thereof rests against the clamping plate 8 which serves as a stop therefor. Hydraulic fluid for the cylinder 2 is supplied from a reservoir 14 composed of stamped sheet metal and carried on the cylinder, the reservoir having a filling opening 15 normally closed by a plug 16 provided with openings 17 for venting the reservoir to atmosphere. The cylinder 2 and the bottom of the reservoir 14 are provided with aligned openings 18 and 19, respectively, located rearwardly of the detached piston head 12 and through which extends a bolt 20 adapted to receive a nut 21 and thereby to clamp together securely the reservoir and cylinder. A suitable ring 20' is disposed about bolt 20 in order to provide a fluid-tight seal between the cylinder barrel 2 and reservoir 14. As seen in Fig. 2 of the drawings, the reservoir 14 has its bottom, forwardly and rearwardly of the nut 21, channeled out to receive the upper convex surface of the cylinder 2; thereby providing, when secured in place by the bolt 20 and nut 21, means for preventing angular movement of the reservoir.

Fluid is admitted from the reservoir to the cylinder rearwardly of the detached piston head 12 by means of a port 22 which extends centrally through the bolt 20.

A primary sealing cup 23 seats both on the detached piston head 12 and on the inner wall of the cylinder barrel 2 and is provided with an annular flange 24 which projects intermediate the annular detached piston head and a reduced diameter portion 25 of the main body of the piston into an annular fluid passage 26 formed therebetween. Valve control means for the fluid passage is provided by a valve seat 11a formed on the main body portion 11 of the piston by the reduced portion 25 thereof, and which seats on the annular flange 24 of the primary cup 23 to seal off the passage 26 upon predetermined protractile movement of the main body portion of the piston. A secondary sealing cup 27 is disposed about the rear end of the main body portion 11 of the piston in order to prevent seepage of fluid from the rear end of the cylinder past the piston. The cup 27 is seated in an annular recess in the main body portion 11 of the piston whose rear extremity is provided with an enlarged diameter flange.

Seated against the primary sealing cup 23 is a bleeder retainer 28 having a circular flange portion 29 which serves to define front and rear chambers 2a and 2b, respectively, of the cylinder. The diameter of the circular flange 29 is slightly less than the bore of the cylinder barrel 2 in order that fluid may flow between the front and rear cylinder chambers 2a and 2b, respectively, when the annular flange 24 of the primary cup 23 and valve seat 11a are not in sealing engagement. A plurality of indents, such as 30, are formed in the circular flange 29 through which fluid may flow between flange 29 and the primary cup 23 so as to pass between the reservoir 14 and the front cylinder chamber 2a when the parts are in their normal unoperated positions. A bleeder cup seal 31 is disposed within the bleeder retainer 28 and is seated against the rounded forward end 32 of the main body portion 11 of the piston so as to be responsive to protractile movement thereof for displacing fluid from the front cylinder chamber 2a by way of an opening 33 in the front end of the bleeder retainer. The bleeder cup seal 31 is yieldably supported by a coil compression spring 34 whose respective ends are seated on the bleeder retainer 28 and on the bleeder cup. The bleeder flange 29 and bleeder seal 31 jointly provide a bleeder cap.

The bleeder retainer 28 is yieldably maintained in an initial unoperated position by means of a coil compression spring 35 whose respective ends are seated on the circular flange of the bleeder retainer and on a valve retainer 36 which forms one element of a two-way line pressure valve. A valve seal 37 carried on the valve retainer 36, and disposed over the fluid pressure delivery port 5, forms the other element of the line pressure valve. The valve retainer 36 is provided with a plurality of openings, such as 38, through which fluid under pressure passes to engage a flexible annular lip 39 on the valve seal 37 with the result that the annular lip which normally seats against the valve retainer, as shown in the drawings, is moved out of engagement therewith to permit the fluid under pressure to pass through the delivery port 5.

An actuating shaft 40 is disposed within the hollow main body portion 11 of the piston 10 and carries at the rear end thereof a suitable coupling member 41 which may, for example, be connected to a linkage mechanism (not shown) manually operable to drive the piston through its protractile stroke. A boot 42 is employed to prevent entrance into the cylinder of dust, grit, dirt, and the like, and is supported at its opposite ends on the clamping plate 8 and the coupling member 41.

The operation of the invention will now be described and for this purpose, it is assumed that the reservoir 14 is filled with a suitable hydraulic brake fluid and that the various component parts of the invention are in their normal unoperated positions, as shown in the drawings. With the parts in their normal unoperated positions, fluid is admitted from the reservoir 14 to the front chamber 2a of the cylinder by way of port 22, annular passage 26, the plurality of indents 30 on the circular flange 29 of the bleeder retainer 28 and around the perimeter of the circular flange itself. Upon inward movement of the shaft 40, the main body portion 11 of the piston begins its protractile stroke and during the initial portion thereof, it moves with respect to the detached head 12 of the piston. When this occurs, the reduced end of the piston body 11 and the bleeder cup seal 31 are driven within the bleeder retainer 28 by the main body portion 11 of the piston to displace fluid in the front chamber 2a of the cylinder. This displaced fluid is caused to flow back into the reservoir 14 over the following path; around the perimeter of the circular flange 29 on the bleeder retainer 28, through the plurality of indents 30 in the circular flange, through the annular passage 26 between the detached head 12 and main body portion 11 of the piston and through the port 22. It is well known that air in the system accumulates in the master cylinder. The velocity of the fluid flowing between the circular flange 29 of the bleeder retainer 28 and the wall of the cylinder barrel 2 is adequate to entrain air bubbles present within the cylinder and syphon them off into the reservoir 14 through the path above described. The detached piston head 12 and primary cup 23 carried thereon, as well as the bleeder retainer 28, are prevented from moving during the initial protractile movement of the main body of the piston by the coil spring 35 which, being substantially stiffer than the coil spring 34, yieldably maintains these members in a fixed position.

The displacement of fluid from the cylinder back to the fluid reservoir continues until the protractile movement of the main body of the piston is such as to cause the valve seat 11a formed thereon to seal against the annular flange 24 of the primary cup 23. When this occurs, the annular passage 26 is sealed off and the detached piston head 12 is engaged and driven by the main body of the piston to displace fluid under pressure through the delivery port 5 by way of the two-way line pressure valve 36—39. It will be understood that sufficient pressure is not developed within the front chamber 2a of the cylinder to operate the two-way line pressure valve until after the annular passage 26 has been sealed off; thereafter, the pressure developed within the front chamber of the cylinder is communicated through openings 38 in the valve retainer 36 to the flexible annular lip 39 on the valve seal 37 to cause the lip to become disengaged from the retainer, thereby providing for the free flow of fluid under pressure to the delivery port 5.

When the actuating shaft 40 is retracted from its applied position, a pressure drop is produced in the front chamber 2a of the cylinder and when this occurs, the valve seal 37 of the two-way line pressure valve will be lifted from its seat upon the end cap 3 by the pressure developed within the respective brake cylinders, as is well known in the art. This pressure developed within the respective brake cylinders is thereupon communicated to the detached head 12 and main body portion 11 of the piston to restore them to their initial unoperated positions shown in the drawings, the detached head being thereafter maintained in its unoperated position by the coil spring 35, and the main body portion of the piston being thereafter maintained in its unoperated position under the influence of the coil spring 34.

When an hydraulic master brake cylinder is first installed in a brake system for use, it is the usual practice to perform what is called a bleeding operation thereon and which consists in reciprocating the piston several times in order to syphon off any air which may be trapped within the cylinder. According to the present invention, this bleeding operation takes place during retractile as well as protractile movement and the former is rendered materially more efficient by the use of a two-way line pressure valve of the type disclosed in conjunction with the bleeder means. It will be noted that the area of the valve retainer element 36 of the line pressure valve is less than the area of the primary cup 23 carried by the detached piston head 12 such that when the piston is reciprocated to bleed the brakes, the suction produced in the front chamber 2a of the cylinder on the retractile stroke of the piston will cause the primary cup to become unseated from the detached head of the piston, thereby opening the annular passage 26. At this point, however, the valve seal 37 of the line pressure valve will remain on its seat and cause the brake system to become overloaded with fluid flowing to the master cylinder from the reservoir. However, when the pressure in the brake system is sufficient a valve seal 37 will be unseated and thereby open the line pressure valve. If the retractile movement continues at a sufficient rate to maintain suction in the forward cylinder chamber 2a the fluid will continue to be pulled from the reservoir into the forward chamber 2a until the detached head 12 strikes the stop ring 13; whereupon continued retractile movement of the piston body 11, under the influence of bleeder spring 34 will hold the seat 11a away from the primary sealing lip 24. The suction chamber 2a having then ceased and the system being overloaded, the fluid from the brake system (under the influence of the released pressure in the system) is forced past the circular flange 29 of the bleeder retainer 28 and through the annular passage 26 to the reservoir 14, the velocity of the fluid flowing past the circular flange being adequate to entrain and carry any air bubbles which may have been present within the system.

In the form of the invention illustrated and described, the possibility of air being trapped within the cylinder is greatly diminished, if not excluded entirely, since the cylinder is bleeded each time the piston is driven through its protractile stroke, as well as on the retractile stroke under the conditions just described. Moreover, by eliminating the compensating port and providing a single fluid supply port between the reservoir and cylinder and locating this port rearwardly of the piston head, the susceptibility to damage of the primary cup by the compensating port is eliminated.

As described above, the cylinder barrel 2, reservoir 14, and the supporting plates 7 and 8, as well as the main body portion 11 of the piston, all are composed of stamped or drawn sheet metal and, therefore, may be manufactured both efficiently and economically. Heretofore, it has been the practice to construct the master cylinder of a metal casting requiring many individual successive machining operations on the same piece. This not only has been costly in time and tooling but the resultant device was greater in weight. By my invention, the parts may be individually made and then assembled; and the resultant product is materially lighter in weight and may be produced at a fraction of the cost of prior devices.

It will be noted that the bracket assembly, comprising plates 7 and 8, for mounting the master cylinder has been located to support it at the rear end thereof, as is required for many installations. There are, however, other installations in which the master cylinder should be supported at its side and, therefore, alternative mounting means suitable for such installations is shown in Fig. 4 of the drawings. It will be seen that the end cap 3 is provided with a reduced portion 43 at the outer extremity thereof in order to form an annular groove 44 between the end cap and the end cap nut 4. To support the cylinder at its side, a side bracket member 45 is provided, one end of which is provided with a circular flange 46 which slides over the cylinder barrel 2 to engage the annular flange 6 at the rear end thereof. The other end of the bracket member 45 also is provided with an annular flange portion 47 which engages within the annular groove 44 whereby the bracket member is made secure to the cylinder at the forward end thereof. To secure the bracket member 45 to the cylinder at the rear end thereof, a plate member 48 is placed over the annular flange 6 on the cylinder barrel 2 and is secured to the circular flange 46 of the bracket member as by screws 49, the plate member 48 also serving as a support for the protective boot 42, as described above. For convenience in manufacture and assembly, the bracket member 45 and plate member 48 are composed of stamped sheet metal which does away with many costly finishing operations, as heretofore described. Thus, instead of having to make and stock separate master cylinder assemblies for the several makes of cars having different mounting locations, one universal master cylinder assembly is all that is required and it may be readily and economically adapted to one of several locations and methods of mounting merely by changing the mounting bracket attachments.

While the invention has been described in particularly with reference to a preferred embodiment thereof, it will be apparent to those skilled in the art after understanding the invention that further modifications and changes may be made therein without departing from the spirit and scope of the invention, as defined by the claims appended hereto.

What is claimed as new and desired to be secured by Letters Patent of the United States is:

1. An hydraulic brake master cylinder comprising, a cylinder, a piston movable therein for producing fluid pressure to operate the brakes, an hydraulic fluid reservoir in fluid communication with said cylinder rearwardly of the head of said piston when the piston is in its fully retracted position, fluid passage means for conveying fluid forwardly of the head of said piston, said piston being adapted to seal off said fluid passage upon predetermined protractile movement thereof, a bleeding member in said cylinder forwardly of the head of said piston and having a circular flange of smaller diameter than the bore of the cylinder, and means responsive to protractile movement of said piston for displacing hydraulic fluid from the cylinder around the perimeter of said circular flange and through said fluid passage to said reservoir until the fluid passage has been sealed off by the piston, thereby to syphon off gases trapped within the cylinder.

2. An hydraulic brake master cylinder comprising, a cylinder, a piston movable therein for producing fluid pressure, an hydraulic fluid reservoir, fluid passage means for admitting fluid from said reservoir to said cylinder, said piston being adapted to seal off said fluid passage upon predetermined protractile movement thereof, a bleeding member in said cylinder spaced forwardly of the head of said piston and having a circular flange of a diameter smaller than the cylinder bore, means responsive to protractile movement of said piston for displacing hydraulic fluid from the cylinder around the perimeter of said circular flange and through said fluid passage to said reservoir until said fluid passage has been sealed off by the piston, thereby to syphon off gases trapped within the cylinder, and means for maintaining said bleeding member in a fixed position until said fluid passage has been sealed off by said piston.

3. An hydraulic brake master cylinder comprising, a cylinder, a bleeding member disposed within said cylinder and having a circular flange of a diameter smaller than the bore of the cylinder, said bleeding member dividing said cylinder into front and rear chambers, an hydraulic fluid reservoir in fluid communication with the rear chamber of the cylinder, fluid passage means establishing fluid communication between the front and rear chambers of the cylinder, a piston movable in the rear chamber of said cylinder, said piston being adapted to move with respect to said bleeding member during the initial portion of its protractile movement and thereafter to drive the bleeding member, and means effective as said piston moves with respect to said bleeding member for displacing fluid from the front chamber of the cylinder to said reservoir, the fluid passing around the flange of the bleeding member and through said fluid passage, thereby to syphon off gases trapped in the front chamber of the cylinder.

4. An hydraulic brake master cylinder comprising, a cylinder, a piston therein including a main body portion and a detached head, said body portion being movable first with respect to and thereafter with said detached head, an hydraulic fluid reservoir communicating with said cylinder rearwardly of the detached head of said piston, the space between the main body portion and detached head of said piston providing a fluid passage, and bleeding means including a circular flange of smaller diameter than the bore of said cylinder, said bleeding means being responsive to relative movement between the main body portion and detached head of said piston for displacing fluid from said cylinder around the circular flange of said bleeding means and through said fluid passage to said fluid reservoir, thereby to syphon off gases trapped within the forward portion of the cylinder.

5. An hydraulic brake master cylinder comprising, a cylinder, a bleeding member therein dividing the cylinder into front and rear chambers, said bleeding member being provided with a circular flange of a smaller diameter than the bore of said cylinder, an hydraulic fluid reservoir communicating with the rear chamber of said cylinder, a piston in said cylinder, said piston including a main body portion and a detached head, said body portion being movable with and with respect to said detached head, the space between the main body portion and detached head of said piston providing a fluid passage between the front and rear chambers of said cylinder, and means responsive to relative movement between the main body portion of said piston and the detached head thereof for displacing fluid from the front chamber of said cylinder into said reservoir, the displaced fluid flowing around the circular flange of said bleeding member and through said fluid passage into the rear chamber of said cylinder, thereby to syphon off gases trapped in the front chamber of the cylinder.

6. An hydraulic brake master cylinder comprising, a cylinder, a piston movable therein for producing fluid pressure and comprising a body and detached head, said piston body and head jointly providing a first valve, resilient means urging said head rearwardly toward said piston body to close said valve, a stop limiting the rearward movement of said head to open said valve near the end of the retractile stroke of said piston body, a reservoir in fluid communication with said cylinder rearwardly of said valve, and a bleeding member disposed within said cylinder forwardly of and in spaced relation to said head, said member and cylinder wall providing therebetween an annularly disposed restricted passageway, whereby the passage of liquid rearwardly therethrough will be of such velocity as to siphon air from the cylinder chamber forwardly of said head through said valve and pass it into said reservoir.

7. An hydraulic master brake cylinder comprising, a cylinder, a piston movable in said cylinder, said piston including a body and a detached head having a valve portion engageable with a complementary portion of said body to provide a valve, an hydraulic fluid reservoir in fluid communication with said cylinder rearwardly of the head of said piston at all times, fluid passage means including said valve for conveying fluid from one side of the head of said piston to the other side, said valve being operable to closed position by the protractile movement of said piston body and to open position by the retractile movement of said piston body, and bleeding means providing a restricted passageway at the peripheral wall of said cylinder adjacent the front of said head and in communication with said valve, whereby fluid flowing from the cylinder in front of said head through said valve and into said reservoir will siphon off gases trapped within said cylinder due to the velocity of flow through said restricted bleeder passageway.

8. An hydraulic brake master cylinder comprising, a cylinder, a bleeder member disposed within said cylinder and having a circular flange of a diameter smaller than the bore of said cylinder, said bleeder member dividing said cylinder into front and rear chambers having a restricted peripherally disposed interconnecting bleeder passage, a liquid reservoir communicating with the rear chamber of said cylinder, a piston in said rear chamber, said piston comprising a body whose forward end is provided with a shoulder serving as a valve seat and an annular detached head provided with a valve portion for engagement with said seat and a peripheral portion for sealing engagement with said cylinder wall, said head and said bleeder member being in spaced relationship to thereby provide fluid communication between said valve and bleeder passage, a compression spring in said forward chamber urging said bleeder member and head toward said piston body and said valve portion toward its seat, a limit stop restricting rearward movement of said head to thereby open said valve upon further retractile movement of said piston body, and resilient means more readily yieldable than said spring urging said piston body valve seat away from said piston head valve portion to open said valve.

9. An hydraulic brake master cylinder comprising, a cylinder, a piston movable therein for producing fluid pressure and comprising a body and detached head, said piston body and head jointly providing a first valve, a reservoir in fluid communication with said cylinder rearwardly of said valve, a bleeding member disposed within said cylinder forwardly of and in spaced relation to said head, said member and cylinder wall providing therebetween an annularly disposed restricted passageway whereby the passage of liquid rearwardly therethrough will be of such velocity as to siphon air from the cylinder chamber forwardly of said head through said valve and pass it into said reservoir, a line valve in the outlet end of said cylinder and having an effective area less than the effective area of said piston head, a common compression spring interposed between said line valve at one end and said bleeder member and piston head at its opposite end for urging said line valve and first valve to closed position, a stop for limiting the rearward movement of said head to thereby open said first valve near the end of the retractile stroke of said piston body, and resilient means interposed between said bleeder member and piston body providing greater resiliency than said spring and operable to urge said valve to open position.

10. An hydraulic master brake cylinder comprising, a cylinder, a piston movable in said cylinder, said piston including a body and a detached head having a valve portion engageable with a complementary portion of said body to provide a first valve, an hydraulic fluid reservoir in fluid communication with said cylinder rearwardly of the head of said piston at all times, fluid passage means including said first valve for conveying fluid from one side of the head of said piston to the other side, a line valve in the outlet end of said cylinder, common resilient means for urging said first valve toward its seat and said line valve to closed position, said line valve being of less effective area than the effective area of said first valve, whereby said first valve will open under a lower suction than said line valve upon retractile movement of said piston and admit overloading fluid into said cylinder from said reservoir before said line valve opens to admit fluid to said cylinder from the system, a stop limiting the rearward movement of said head to open said first valve near the end of the retractile stroke of said piston body, and bleeding means providing a restricted passageway adjacent the peripheral wall of said cylinder contiguous with said head and in communication with said first valve, whereby when line pressure fluid opens said line valve displacing fluid from said cylinder through said first valve to said reservoir said displaced fluid will flow through said restricted bleeding passage at relatively high velocity and siphon off gases trapped in said cylinder.

MARTIN V. GROVES.

REFERENCES CITED

The following references are of record in the file of this patent:

UNITED STATES PATENTS

| Number | Name | Date |
| --- | --- | --- |
| 2,211,652 | Gardner | Aug. 13, 1940 |
| 2,255,359 | Lepersonne | Sept. 9, 1941 |
| 2,352,920 | Stevens | July 4, 1944 |
| 2,357,386 | Dick | Sept. 5, 1944 |